United States Patent
Watabe

(10) Patent No.: US 8,144,023 B2
(45) Date of Patent: Mar. 27, 2012

(54) TIRE INFLATION PRESSURE DETECTING APPARATUS CAPABLE OF TRIGGERING ONLY SELECTED TRANSCEIVER TO PERFORM TASK

(75) Inventor: Nobuya Watabe, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 831 days.

(21) Appl. No.: 12/198,525

(22) Filed: Aug. 26, 2008

(65) Prior Publication Data

US 2009/0058626 A1 Mar. 5, 2009

(30) Foreign Application Priority Data

Aug. 28, 2007 (JP) .................................. 2007-221125

(51) Int. Cl.
- *G08B 21/00* (2006.01)
- *B60C 23/00* (2006.01)
- *B60C 23/02* (2006.01)

(52) U.S. Cl. ........ 340/626; 340/442; 340/445; 340/443; 73/146.5

(58) Field of Classification Search .................. 340/626, 340/442, 443, 445, 505, 10.1, 10.4, 572.1; 73/146.5

See application file for complete search history.

(56) References Cited

U.S. PATENT DOCUMENTS

| 5,223,815 | A | 6/1993 | Rosenthal et al. | |
|---|---|---|---|---|
| 6,369,712 | B2 * | 4/2002 | Letkomiller et al. | 340/572.1 |
| 6,879,252 | B2 * | 4/2005 | DeZorzi et al. | 340/505 |
| 7,161,476 | B2 * | 1/2007 | Hardman et al. | 340/442 |
| 7,515,040 | B2 * | 4/2009 | Mori et al. | 340/442 |
| 7,639,124 | B2 * | 12/2009 | Mori et al. | 340/442 |
| 2007/0008097 | A1 | 1/2007 | Mori et al. | |

FOREIGN PATENT DOCUMENTS

| CN | 1892199 | 1/2007 |
|---|---|---|
| JP | 2007-015491 | 1/2007 |

OTHER PUBLICATIONS

Chinese Office Action dated May 19, 2010, issued in corresponding Chinese Application No. 200810173765.X, with English translation.

* cited by examiner

*Primary Examiner* — John A Tweel, Jr.

(74) *Attorney, Agent, or Firm* — Nixon & Vanderhye PC

(57) ABSTRACT

A transceiver includes a receiver, a signal strength determiner, and a controller. The receiver receives a trigger signal transmitted by a triggering device; the trigger signal indicates both a signal strength range and a command. The signal strength determiner determines the strength of the trigger signal received by the receiver. The controller is configured to: 1) determine whether the strength of the trigger signal determined by the signal strength determiner is within the signal strength range indicated by the trigger signal; 2) and perform a task in accordance with the command indicated by the trigger signal only when the strength of the trigger signal is within the signal strength range.

9 Claims, 7 Drawing Sheets

FIG. 3

| PREAMBLE & ACTIVATION COMMAND | 1ST COMM. | 2ND COMM. | 1ST DATA | 2ND DATA | 3RD DATA | ... | NTH DATA |

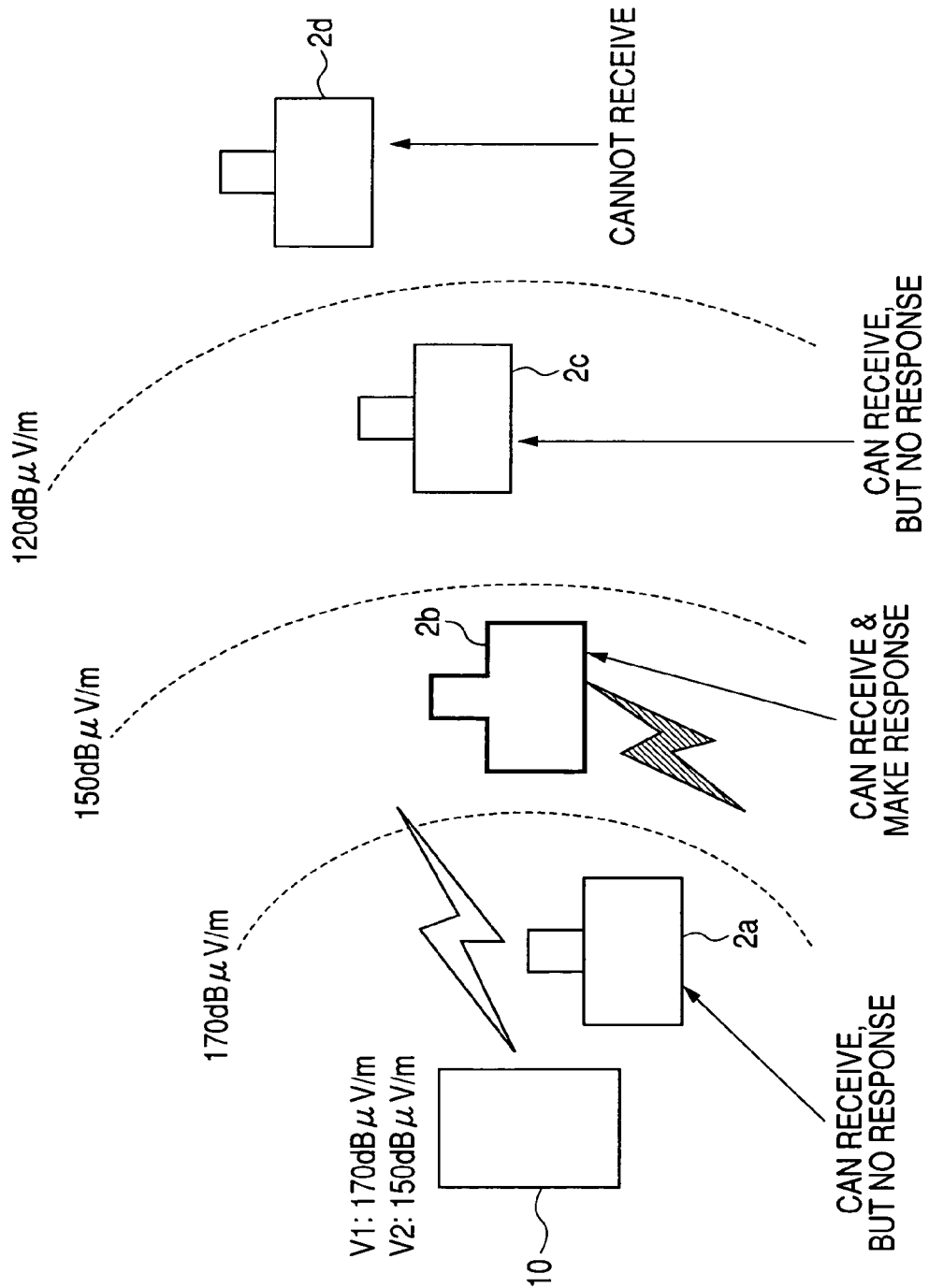

TIRE INFLATION PRESSURE DETECTING APPARATUS CAPABLE OF TRIGGERING ONLY SELECTED TRANSCEIVER TO PERFORM TASK

CROSS-REFERENCE TO RELATED APPLICATION

This application is based on and claims priority from Japanese Patent Application No. 2007-221125, filed on Aug. 28, 2007, the content of which is hereby incorporated by reference in its entirety into this application.

BACKGROUND OF THE INVENTION

1. Technical Field of the Invention

The present invention relates generally to tire inflation pressure detecting apparatuses for detecting the inflation pressures of tires on a vehicle.

More particularly, the invention relates to a direct-type tire inflation pressure detecting apparatus which has a capability of selecting a target transceiver from a plurality of transceivers and triggering only the target transceiver to perform a specific task.

2. Description of Related Art

A conventional direct-type tire inflation pressure detecting apparatus includes a plurality of transmitters and a receiver. Each of the transmitters is directly mounted on one of a plurality of wheels of a vehicle and includes a pressure sensor for sensing the inflation pressure of a tire fitted on the wheel. Each of the transmitters is configured to transmit a pressure signal representative of the inflation pressure of the tire sensed by the pressure sensor. The receiver is mounted on the body of the vehicle and includes at least one antenna. The receiver is configured to receive, via the antenna, the pressure signals transmitted by the transmitters and determine the inflation pressures of the tires based on the received pressure signals.

However, with the above configuration, it is impossible for the receiver to detect the locations of the transmitters. In other words, the receiver cannot identify the wheel on which the transmitter having transmitted a pressure signal is located.

To solve the above problem, Japanese Patent First Publication No. 2007-15491, an English equivalent of which is US Patent Application Publication No. 2007/0008097 A1, discloses a tire inflation pressure detecting apparatus which has a function of wheel identification. More specifically, this apparatus includes a plurality of transceivers each of which is mounted on one of a plurality of wheels of a vehicle, at least one triggering device that is mounted on the body of the vehicle at different distances from the transceivers, and a receiver located on the body of the vehicle. The triggering device transmits a trigger signal at a low frequency in the range of, for example, 125 to 135 kHz. The strength of the trigger signal attenuates with increase in the distance from the triggering device. Therefore, the strengths of the trigger signal at the transceivers are different from each other. In response to receipt of the trigger signal, each of the transceivers determines the strength of the trigger signal thereat and transmits a response signal which contains signal strength information about the determined strength of the trigger signal. The receiver receives the response signals transmitted by the transceivers and identifies, for each of the received response signals, the wheel on which the transceiver having transmitted the response signal is located based on the signal strength information contained in the response signal.

For such a tire inflation pressure detecting apparatus as described above, each of the transceivers may be configured to periodically transmit a pressure signal to the receiver. In this case, during inspection of the tire inflation pressure detecting apparatus before shipment, it is necessary for an inspector to transmit, using a special triggering tool, the trigger signal which contains a stop command, thereby triggering a target transceiver (i.e., a selected one of the transceivers) to stop the periodic transmission of the pressure signal.

However, when the distance between the triggering tool and the target transceiver is long, other transceivers than the target transceiver may also receive the trigger signal, thus being undesirably triggered to stop the periodic transmission before being inspected.

To avoid the above problem, two methods can be considered. One method is to lower all the receiver sensitivities of the transceivers and have the inspector transmit the trigger signal at a sufficiently short distance (for example 30 cm) from the target transceiver. The other method is to lower the strength at which the trigger signal is transmitted and have the inspector transmit the trigger signal at a sufficiently short distance from the target transceiver. However, with either of the two methods, the inspector has to locate the triggering tool in close vicinity to the target transceiver, which is generally fixed to the air valve of the associated wheel, thus significantly lowering inspection efficiency.

Furthermore, during operation of the tire inflation pressure detecting apparatus, it is desirable for the triggering device to transmit the trigger signal which contains a specific command, thereby triggering only a target transceiver (i.e., a selected one of the transceivers) to perform a specific task.

SUMMARY

According to one aspect of the present exemplary embodiment, there is provided a transceiver which includes a receiver, a signal strength determiner, and a controller.

The receiver receives a trigger signal transmitted by a triggering device; the trigger signal indicates both a signal strength range and a command. The signal strength determiner determines the strength of the trigger signal received by the receiver. The controller is configured to: 1) determine whether the strength of the trigger signal determined by the signal strength determiner is within the signal strength range indicated by the trigger signal; 2) and perform a task in accordance with the command indicated by the trigger signal only when the strength of the trigger signal is within the signal strength range.

According to another aspect of the present exemplary embodiment, there is provided a wireless communication system for a vehicle, which includes first and second transceivers, a triggering device, and a controller.

The first and second transceivers are respectively located on first and second wheels of the vehicle. Each of the transceivers is configured to: 1) receive a trigger signal that indicates both a signal strength range and a command; 2) determine the strength of the trigger signal thereat; 3) determine whether the determined strength of the trigger signal is within the signal strength range indicated by the trigger signal; and 4) perform a task in accordance with the command indicated by the trigger signal only when the determined strength of the trigger signal is within the signal strength range.

The triggering device transmits the trigger signal. The triggering device is located on the body of the vehicle at different distances from the first and second transceivers, so that the strengths of the trigger signal at the transceivers are different from each other.

The controller is also located on the body of the vehicle. The controller is configured to: 1) select one of the first and second transceivers; 2) set the signal strength range indicated by the trigger signal so that only the strength of the trigger signal at the selected one of the first and second transceivers is to fall within the signal strength range; and 3) control the triggering device to transmit the trigger signal, thereby triggering only the selected one of the first and second transceivers to perform the task in accordance with the command indicated by the trigger signal.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 3 is a schematic view illustrating a digital format of trigger signals transmitted by triggering devices of the tire inflation pressure detecting apparatus;

FIGS. 6A and 6B are schematic views illustrating the condition for the transceivers to make a response to the trigger signal.

DESCRIPTION OF PREFERRED EMBODIMENT

Figure 1:
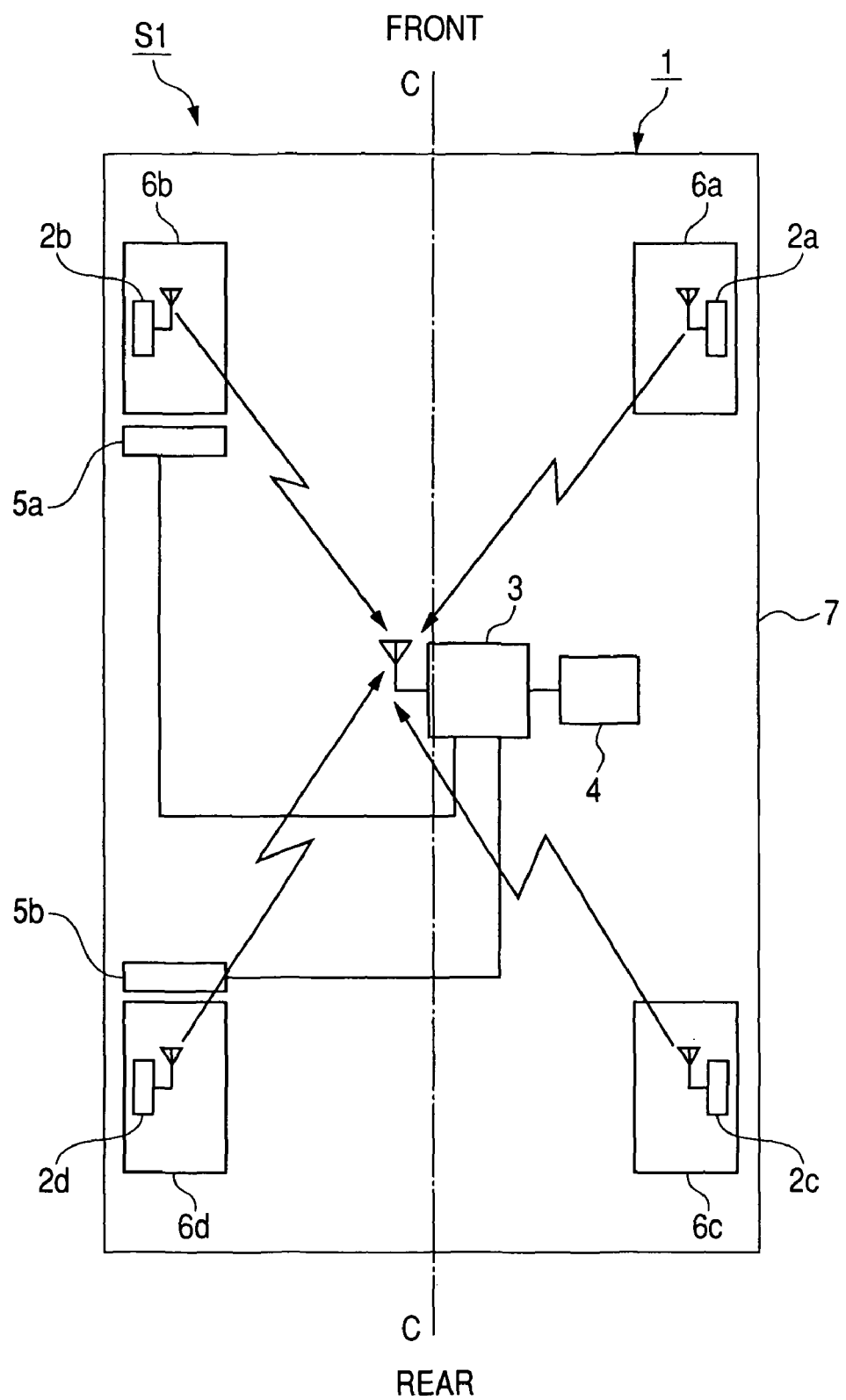
FIG. 1 is a schematic view showing the overall configuration of a tire inflation pressure detecting apparatus for a vehicle according to an embodiment of the invention.

FIG. 1 shows the overall configuration of a tire inflation pressure detecting apparatus S1 according to an embodiment of the invention.

The tire inflation pressure detecting apparatus S1 is installed to a vehicle 1 to detect the inflation pressures of four tires that are respectively fitted on four wheels 6a-6d of the vehicle 1 (i.e., the FR wheel 6a, the FL wheel 6b, the RR wheel 6c, and the RL wheel 6d).

As shown in FIG. 1, the tire inflation pressure detecting apparatus S1 includes four transceivers 2a-2d, a receiver 3, a warning device 4, and first and second triggering devices 5a and 5b.

The transceivers 2a-2d are respectively mounted on the four wheels 6a-6d of the vehicle 1, so as to respectively have association with the tires fitted on the wheels 6a-6d.

Each of the transceivers 2a-2d senses the inflation pressure of the associated tire, assembles a frame that contains tire pressure information indicative of the sensed inflation pressure, and transmits the frame to the receiver 3. Each of the transceivers 2a-2d also receives a trigger signal transmitted by a corresponding one of the triggering devices 5a and 5b, determines the strength of the trigger signal thereat, determines a signal strength range indicated by the trigger signal, and performs a specific task when the determined strength of the trigger signal is within the determined signal strength range.

Figure 2A:
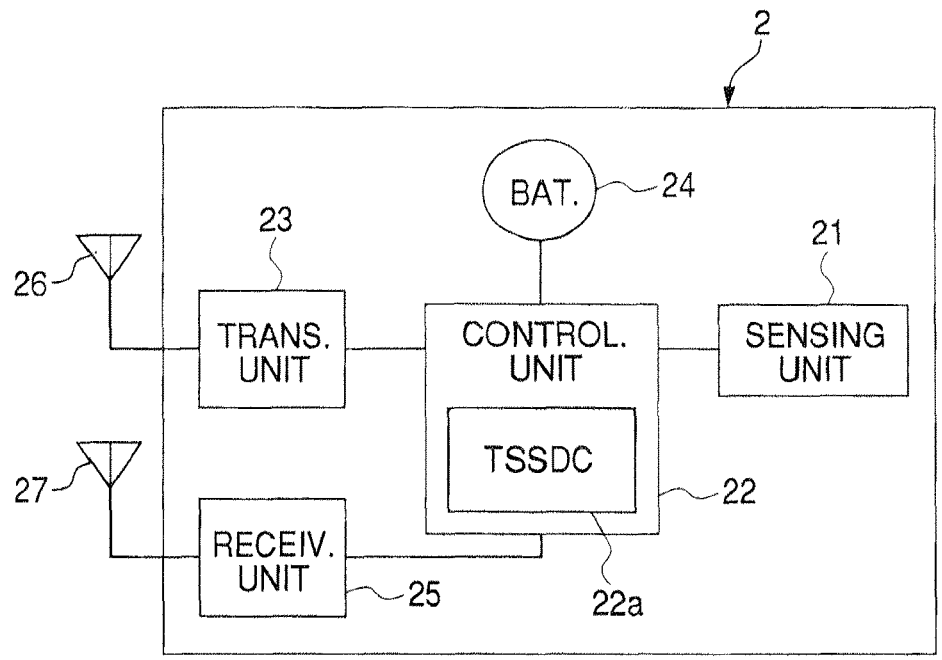
FIG. 2A is a functional block diagram showing the configuration of each of the transceivers of the tire inflation pressure detecting apparatus.

Referring to FIG. 2A, each of the transceivers 2a-2d is configured with a sensing unit 21, a controlling unit 22, a transmitting unit 23, a battery 24, a receiving unit 25, a transmitting antenna 26, and a receiving antenna 27.

The sensing unit 21 includes sensors, such as a diaphragm-type pressure sensor and a temperature sensor, and outputs signals representative of the inflation pressure and inside temperature of the associated tire sensed by the pressure sensor and temperature sensor.

The controlling unit 22 is made up of a microcomputer of a well-known type, which includes a CPU, a ROM, a RAM, and I/O devices. The controlling unit 22 is configured to implement predetermined processes in accordance with a program installed in the ROM.

Specifically, the controlling unit 22 receives the signals output from the sensing unit 21 and processes those signals. Then, the controlling unit 22 assembles the frame, which contains either or both of the tire pressure information indicative of the sensed inflation pressure of the associated tire and ID information indicative of the identity of the each of the transceivers 2a-2d, and provides the frame to the transmitting unit 23.

The controlling unit 22 also receives, via the receiving antenna 27 and the receiving unit 25, the trigger signal transmitted by the corresponding one of the triggering devices 5a and 5b. The controlling unit 22 includes a Trigger Signal Strength Determination Circuit (TSSDC) 22a to determine the strength of the received trigger signal.

The controlling unit 22 is normally in a "sleep" mode. Upon receipt of the trigger signal, the controlling unit 22 is activated by an activation command contained in the trigger signal to enter a "wake-up" mode.

When the trigger signal further contains a signal-receiving level determination command, the TSSDC 22a of the controlling unit 22 determines the strength of the trigger signal at the controlling unit 22. Then, the controlling unit 22 determines whether the strength of the trigger signal determined by the TSSDC 22a is within the signal strength range indicated by the trigger signal. Further, when the strength of the trigger signal is within the signal strength range, the controlling unit 22 performs a specific task in accordance with a specific command contained in the trigger signal.

The transmitting unit 23 transmits, under control of the controlling unit 22 and via the transmitting antenna 26, the frame provided by the controlling unit 22 at a radio frequency of, for example, 315 MHz.

The receiving unit 25 receives, via the receiving antenna 27, the trigger signal and provides the received trigger signal to the controlling unit 22.

The battery 24 is provided to supply electrical power necessary for operation of the other units.

The above-described transceivers 2a-2d are each fixed to an air valve of the associated one of the wheels 6a-6d, with at least the sensing unit 21 thereof exposed to the air inside the associated tire.

On the other hand, the receiver 3 is mounted on the body 7 of the vehicle 1. The receiver 3 receives all the frames transmitted by the transceivers 2a-2d, and determines the inflation pressures of the four tires based on the tire pressure information contained in the respective frames. The receiver 3 also identifies, for each of the received frames, the wheel on which the one of the transceivers 2a-2d which has transmitted the frame is mounted. The receiver 3 further controls the first and second triggering devices 5a and 5b to transmit trigger signals.

Figure 2B:
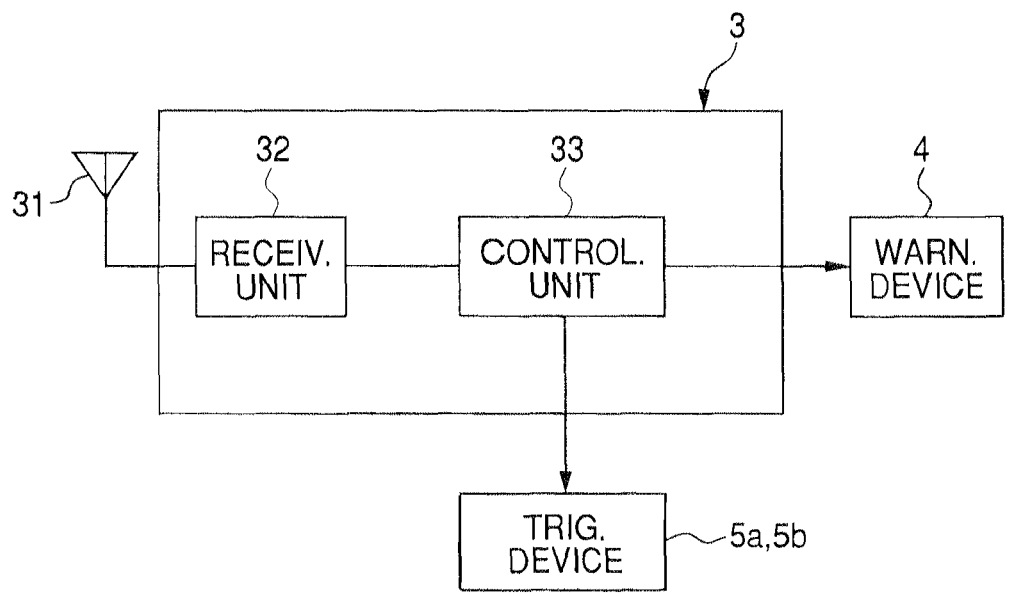
FIG. 2B is a functional block diagram showing the configuration of a receiver of the tire inflation pressure detecting apparatus.

Referring to FIG. 2B, the receiver 3 is configured with a receiving antenna 31, a receiving unit 32, and a controlling unit 33.

The receiving antenna 31 is fixed to the body 7 of the vehicle 1 so as to function, as illustrated in FIG. 1, as a common receiving antenna to all the four transceivers 2a-2d.

The receiving unit 32 receives, via the receiving antenna 31, all the frames transmitted by the transceivers 2a-2d and provides the received frames to the controlling unit 33.

The controlling unit 33 is made up of a microcomputer of a well-known type, which includes a CPU, a ROM, a RAM, and I/O devices. The controlling unit 33 is configured to implement predetermined processes in accordance with a program installed in the ROM thereof.

Specifically, the controlling unit 33 outputs a first command signal to the first triggering device 5a, thereby commanding the first triggering device 5a to transmit trigger signals to the transceivers 2a and 2b on the front wheels 6a and 6b. The controlling unit 33 also outputs a second command signal to the second triggering device 5b, thereby commanding the second triggering device 5b to transmit trigger signals to the transceivers 2c and 2d on the rear wheels 6c and 6d.

Moreover, the controlling unit 33 identifies, for each of the frames received from the receiving unit 32, the wheel on which the one of the transceivers 2a-2d which has transmitted the frame is mounted. Further, the controlling unit 33 determines, for each of the frames which contain tire pressure information, the inflation pressure of the associated tire based on the tire pressure information contained in the frame.

Thus, the inflation pressures of the four tires can be determined by the controlling unit 33. When any of the determined inflation pressures of the four tires is below a predetermined threshold Th, in other words, when any of the four tires is flattened, the controlling unit 33 outputs a warning signal that indicates both the inflation pressure and location of the flattened tire.

The warning device 4 is, as illustrated in FIG. 1, electrically connected to the receiver 3 and located in a place visible for the driver of the vehicle 1. The warning device 4 is configured with, for example, a warning display on the instrument panel of the vehicle 1. The warning device 4 informs, in response to receipt of the warning signal from the receiver 3, the driver of the inflation pressure and location of the flattened tire.

The first and second triggering devices 5a and 5b are both mounted on the body 7 of the vehicle 1. The first triggering device 5a transmits, in response to receipt of the first command signal from the controlling unit 33 of the receiver 3, the trigger signals to the transceivers 2a and 2b at a predetermined strength and a low frequency of, for example, 125-135 kHz. Similarly, the second triggering device 5b transmits, in response to receipt of the second command signal from the controlling unit 33 of the receiver 3, the trigger signals to the transceivers 2c and 2d at the predetermined strength and the low frequency.

The first triggering device 5a is located closer to the front axle than the rear axle of the vehicle 1, so that only the transceivers 2a and 2b on the front wheels 6a and 6b can receive the trigger signals transmitted by the first triggering device 5a. Further, the first triggering device 5a is offset from the longitudinal centerline C-C of the vehicle 1, so as to make the strengths of the trigger signals at the transceiver 2a different from those at the transceiver 2b. On the other hand, the second triggering device 5b is located closer to the rear axle than the front axle of the vehicle 1, so that only the transceivers 2c and 2d on the rear wheels 6c and 6d can receive the trigger signals transmitted by the second triggering device 5b. Further, the second triggering device 5b is also offset from the longitudinal centerline C-C of the vehicle 1, so as to make the strengths of the trigger signals at the transceiver 2c different from those at the transceiver 2d.

More specifically, in the present embodiment, the first triggering device 5a is located in the vicinity of the FL wheel 6b, so that the strengths of the trigger signals transmitted by the first triggering device 5a is higher at the transceiver 2b than at the transceiver 2a. Similarly, the second triggering device 5b is located in the vicinity of the RL wheel 6d, so that the strengths of the trigger signals transmitted by the second triggering device 5b is higher at the transceiver 2d than at the transceiver 2c.

In addition, it is preferable for the first and second triggering devices 5a and 5b to be located in places where no metal members completely surround the devices 5a and 5b and where the devices 5a and 5b can be protected from foreign matter, such as water and stones. In the present embodiment, the first triggering device 5a is located within the FL wheel well, and the second triggering device 5b is located within the RL wheel well of the vehicle 1.

FIG. 3 shows a digital format of the trigger signals transmitted by the triggering devices 5a and 5b. In the present embodiment, each of the trigger signals is, for example, ASK (Amplitude-Shift Keying)-modulated.

As shown in FIG. 3, each of the trigger signals includes a head field, first and second command fields, and a plurality of data fields.

The head field contains both a preamble and the activation command. The activation command is predetermined as a command to shift the controlling units 22 of the transceivers 2a-2d from the sleep mode to the wake-up mode.

The first command field may contain the signal-receiving level determination command. In this case, upon receipt of the signal-receiving level determination command, the TSSDC 22a of the controlling unit 22 of each of the transceivers 2a-2d starts to determine the receiving strength of the remaining fields (i.e., the second command field plus all the data fields) as the strength of the trigger signal at the controlling unit 22. Then, the controlling unit 22 determines whether the strength of the trigger signal determined by the TSSDC 22a is within the signal strength range which is to be described in detail later. Further, when the strength of the trigger signal is within the signal strength range, the controlling unit 22 performs a specific task in accordance with a specific command that is contained in the second command filed of the trigger signal.

For example, when the specific command is an ID information transmission command, the controlling unit 22 assembles into the frame only the ID information, and provides the frame to the transmitting unit 23; then, the transmitting unit 23 transmits the frame to the receiver 3. Otherwise, when the specific command is a tire pressure transmission command, the controlling unit 22 assembles into the frame both the tire pressure information and ID information, and provides the frame to the transmitting unit 23; then, the transmitting unit 23 transmits the frame to the receiver 3.

The first data field contains an upper limit of the signal strength range. The second data field contains a lower limit of the signal strength range. Therefore, the signal strength range can be determined based on the data contained in the first and second data fields.

The remaining data fields may contain other necessary data. For example, the remaining data field may contain data that represent requirements for the transmission of the frame. Those requirements include, for example, how many times the frame should be continuously transmitted.

Figure 4:
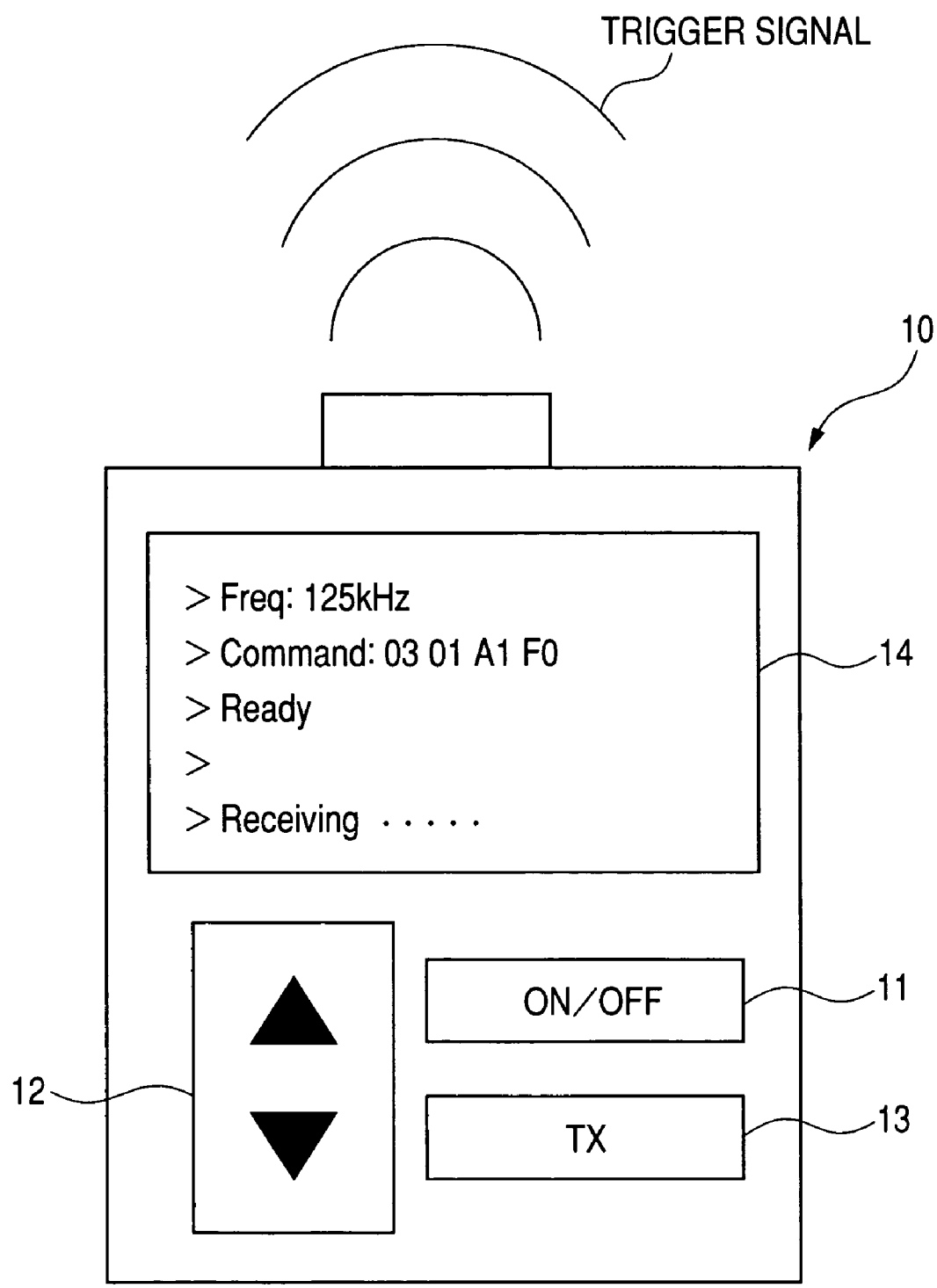
FIG. 4 is a schematic view showing the configuration of a triggering tool used for inspection of the tire inflation pressure detecting apparatus.

FIG. 4 shows the configuration of a special triggering tool 10 that is used for inspection of the tire inflation pressure detecting apparatus S1 before shipment.

During the inspection, an inspector uses the triggering tool 10 to transmit, instead of the triggering devices 5a and 5b, to the transceivers 2a-2d a trigger signal that has the digital format as described above.

The second command field in the trigger signal transmitted by the triggering tool 10 may contain various commands for inspection of the transceivers 2a-2d. For example, the second command field may contain a stop command, upon receipt of which the transceivers 2a-2d stop periodically transmitting the tire pressure information to the receiver 3.

As shown in FIG. 4, the triggering tool 10 includes an ON/OFF switch 11 for turning on and off power, a command selection switch 12 for selecting a command to be contained in the second field of the trigger signal, a transmission start switch 13 for starting transmission of the trigger signal, and a display 14 for displaying the frequency and contents of the trigger signal as well as the response of the transceivers 2a-2d to the trigger signal.

Figure 5:
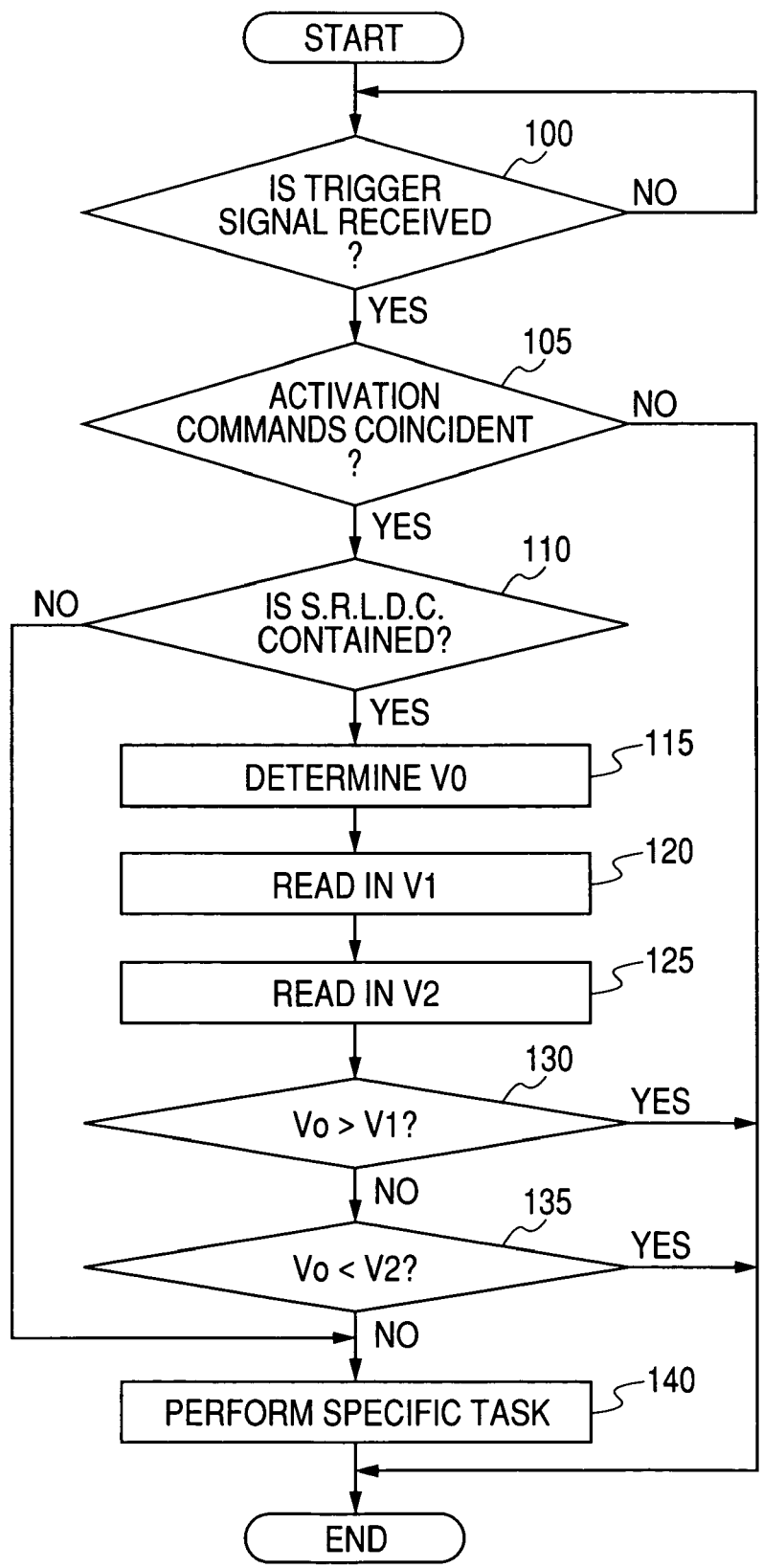
FIG. 5 is a flow chart illustrating a process which each of the transceivers of the tire inflation pressure detecting apparatus performs in response to receipt of a trigger signal.

FIG. 5 shows a process which each of the transceivers 2a-2d performs in response to receipt of the trigger signal transmitted by the triggering tool 10.

It should be noted that the transceivers 2a-2d also perform this process in response to receipt of the trigger signals transmitted by the corresponding ones of the triggering devices 5a and 5b during operation of the tire inflation pressure detecting apparatus S1.

In step 100, the controlling unit 22 of each of the transceivers 2a-2d checks whether a trigger signal is received thereby.

If the check in step 100 produces a "NO" answer, then the controlling unit 22 repeats step 100. Otherwise, if the check in step 100 produces a "YES" answer, then the process proceeds to step 105.

In step 105, the controlling unit 22 determines whether the activation command contained in the trigger signal is coincident with an activation command stored in the ROM thereof.

If the determination in step 105 produces a "NO" answer, then the process directly goes to the end. Otherwise, if the determination in step 105 produces a "YES" answer, then the process proceeds to step 110.

In step 110, the controlling unit 22 checks whether the signal-receiving level determination command (abbreviated to S.R.L.D.C. in FIG. 5) is contained in the first command field of the trigger signal.

If the check in step 110 produces a "NO" answer, then the process proceeds to step 140. Otherwise, if the check in step 110 produces a "YES" answer, then the process goes on to step 115.

In step 115, the TSSDC 22a of the controlling unit 22 determines the strength V0 of the trigger signal at the controlling unit 22.

In step 120, the controlling unit 22 reads in the upper limit V1 of the signal strength range contained in the first data field of the trigger signal. In step 125, the controlling unit 22 reads in the lower limit V2 of the signal strength range contained in the second data field of the trigger signal.

In step 130, the controlling unit 22 determines whether the determined strength V0 of the trigger signal is higher than the upper limit V1.

If the determination in step 130 produces a "YES" answer, then the process directly goes to the end. Otherwise, if the determination in step 130 produces a "NO" answer, then the process proceeds to step 135.

In step 135, the controlling unit 22 further determines whether the determined strength V0 of the trigger signal is lower than the lower limit V2.

If the determination in step 135 produces a "YES" answer, then the process directly goes to the end. Otherwise, if the determination in step 135 produces a "NO" answer, then the process proceeds to step 140.

In step 140, the controlling unit 22 performs a specific task in accordance with the specific command contained in the second command field of the trigger signal.

For example, as described above, when the specific command is the tire pressure transmission command, the controlling unit 22 assembles a frame that contains both the tire pressure information and ID information, and provides the frame to the transmitting unit 23; then, the transmitting unit 23 transmits the frame to the receiver 3.

Figure 6A:
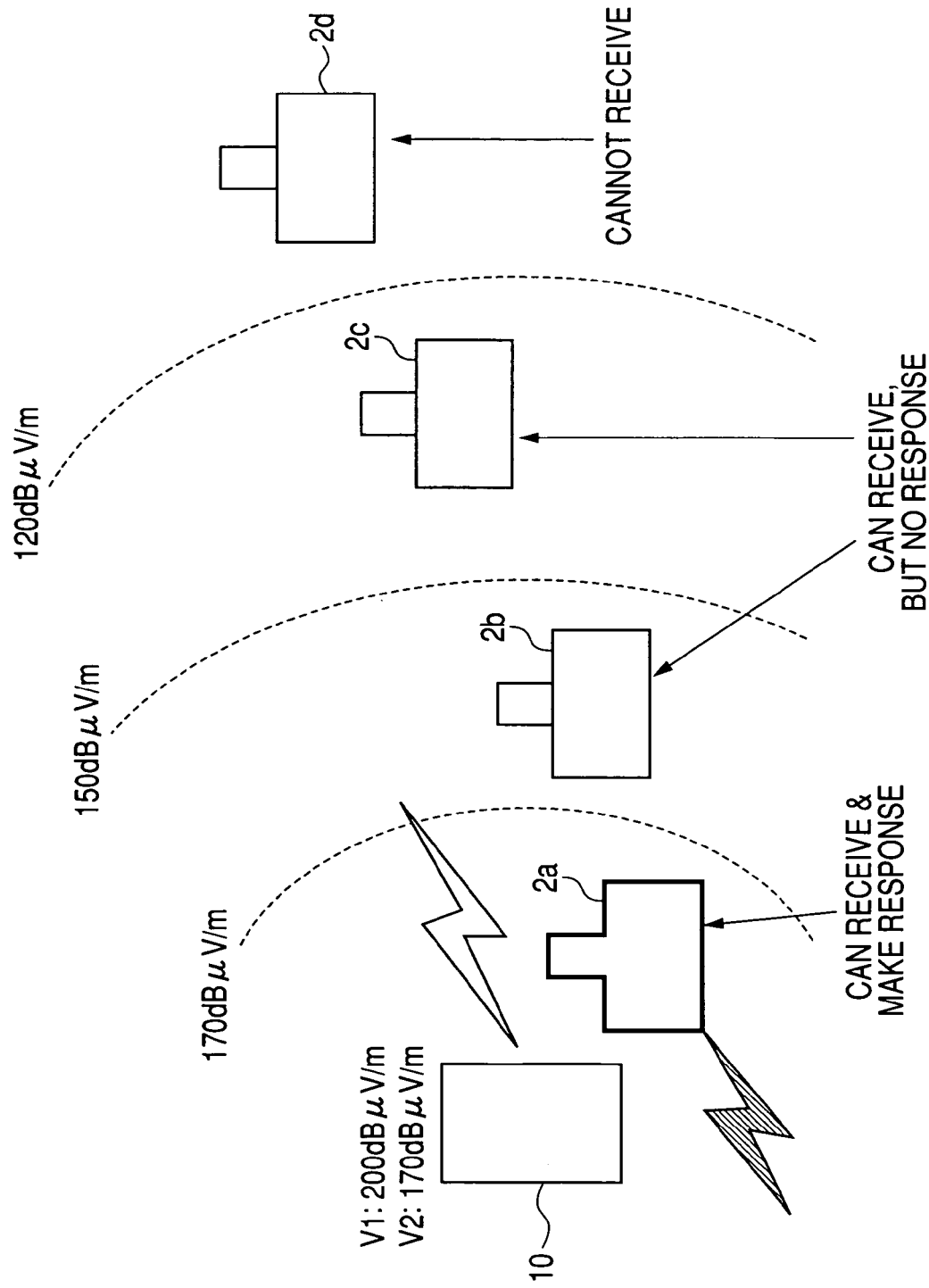

FIGS. 6A and 6B illustrate the condition for the transceivers 2a-2d to make a response to the trigger signal transmitted by the triggering tool 10.

In those figures, the triggering tool 10 is so located that the strengths of the trigger signal at the transceivers 2a-2d decrease in the order of 2a, 2b, 2c, and 2d. More specifically, the strength of the trigger signal is higher than 170 dBµV/m at the transceiver 2a, between 150 and 170 dBµV/m at the transceiver 2b, between 120 and 150 dBµV/m at the transceiver 2c, and lower than 120 dBµV/m at the transceiver 2d. Moreover, the triggering tool 10 transmits the trigger signal at a strength of 200 dBµV/m.

When the transceiver 2a is selected as the target transceiver, the upper limit V1 and lower limit V2 in the trigger signal are respectively set to 200 and 170 dBµV/m. Then, as illustrated in FIG. 6A, only the transceiver 2a can receive the trigger signal and transmit a frame as a response to the trigger signal; both the transceivers 2b and 2c can receive the trigger signal, but make no response to the trigger signal since the strengths of the trigger signal thereat are out of the signal strength range of 170 to 200 dBµV/m; the transceiver 2d cannot receive (or identify) the trigger signal.

Otherwise, when the transceiver 2b is selected as the target transceiver, the upper limit V1 and lower limit V2 in the trigger signal are respectively set to 170 and 150 dBµV/m. Then, as illustrated in FIG. 6B, only the transceiver 2b can receive the trigger signal and transmit a frame as a response to the trigger signal; both the transceivers 2a and 2c can receive the trigger signal, but make no response to the trigger signal since the strengths of the trigger signal thereat are out of the signal strength range of 150 to 170 dBµV/m; the transceiver 2d cannot receive the trigger signal.

As above, in the present embodiment, the inspector can select any of the four transceivers 2a-2d as the target transceiver by accordingly setting the upper limit V1 and lower limit V2 in the trigger signal. On the other hand, each of the transceivers 2a-2d can determine, upon receipt of the trigger signal, whether it is selected as the target transceiver by determining whether the strength V0 of the trigger signal thereat is within the signal strength range of V2 to V1. Further, when selected as the target transceiver, each of the transceivers 2a-2d performs a specific task in accordance with the specific command contained in the second command field of the trigger signal.

With the above configuration, it is possible for the inspector to select any of the transceivers 2a-2d as the target transceiver and trigger (or cause) only the target transceiver to perform the specific task without having to locate the triggering tool 10 in close vicinity to the target transceiver. Consequently, inspection efficiency can be significantly improved.

Next, operation of the tire inflation pressure detecting apparatus S1 will be described.

According to the present embodiment, the tire inflation pressure detecting apparatus S1 has two different operation modes. The first mode is "ID registration mode" and the second one is "periodic tire pressure transmission mode". The tire inflation pressure detecting apparatus S1 is configured to operate in the ID registration mode first and then in the periodic tire pressure transmission mode.

Specifically, when an ignition switch (not shown) of the vehicle 1 is turned from off to on, the receiver 3 and the triggering devices 5a and 5b are supplied with electric power from a battery (not shown) on the vehicle 1, entering the ID registration mode.

First, the controlling unit 33 of the receiver 3 outputs the first command signal to the first triggering device 5a. Upon receipt of the first command signal, the first triggering device 5a first transmits a first trigger signal at the predetermined strength and the low frequency; then, the first triggering device 5a further transmits a second trigger signal at the predetermined strength and the low frequency.

Each of the first and second trigger signals contains the signal-receiving level determination command in the first command field and the ID information transmission command in the second command field. However, the upper limit V1 and lower limit V2 of the signal strength range contained in the first trigger signal are different from those contained in the second trigger signal.

More specifically, the upper limit V1 and lower limit V2 of the signal strength range in the first trigger signal are so set, by the controlling unit 33 of the receiver 3, that only the transceiver 2a can transmit, in response to receipt of the first trigger signal, the frame that contains the ID information indicative of the identity of the transceiver 2a. Accordingly, the controlling unit 33 identifies the frame, which is received by the receiver 3 immediately after transmission of the first trigger signal, as being transmitted by the transceiver 2a. Then, the controlling unit 33 retrieves the ID information from the frame transmitted by the transceiver 2a, and registers in the RAM the retrieved ID information as reference ID information associated with the FR wheel 6a.

Similarly, the upper limit V1 and lower limit V2 of the signal strength range in the second trigger signal are so set, by the controlling unit 33 of the receiver 3, that only the transceiver 2b can transmit, in response to receipt of the second trigger signal, the frame that contains the ID information indicative of the identity of the transceiver 2b. Accordingly, the controlling unit 33 identifies the frame, which is received by the receiver 3 immediately after transmission of the second trigger signal, as being transmitted by the transceiver 2b. Then, the controlling unit 33 retrieves the ID information from the frame transmitted by the transceiver 2b, and registers in the RAM the retrieved ID information as reference ID information associated with the FL wheel 6b.

Further, the controlling unit 33 of the receiver 3 outputs the second command signal to the second triggering device 5b. Upon receipt of the second command signal, the second triggering device 5b first transmits a third trigger signal at the predetermined strength and the low frequency; then, the second triggering device 5b further transmits a fourth trigger signal at the predetermined strength and the low frequency.

Each of the third and fourth trigger signals contains the signal-receiving level determination command in the first command field and the ID information transmission command in the second command field. However, the upper limit V1 and lower limit V2 of the signal strength range contained in the third trigger signal are different from those contained in the fourth trigger signal.

More specifically, the upper limit V1 and lower limit V2 of the signal strength range in the third trigger signal are so set, by the controlling unit 33 of the receiver 3, that only the transceiver 2c can transmit, in response to receipt of the third trigger signal, the frame that contains the ID information indicative of the identity of the transceiver 2c. Accordingly, the controlling unit 33 identifies the frame, which is received by the receiver 3 immediately after transmission of the third trigger signal, as being transmitted by the transceiver 2c. Then, the controlling unit 33 retrieves the ID information from the frame transmitted by the transceiver 2c, and registers in the RAM the retrieved ID information as reference ID information associated with the RR wheel 6c.

Similarly, the upper limit V1 and lower limit V2 of the signal strength range in the fourth trigger signal are so set, by the controlling unit 33 of the receiver 3, that only the transceiver 2d can transmit, in response to receipt of the fourth trigger signal, the frame that contains the ID information indicative of the identity of the transceiver 2d. Accordingly, the controlling unit 33 identifies the frame, which is received by the receiver 3 immediately after transmission of the fourth trigger signal, as being transmitted by the transceiver 2d. Then, the controlling unit 33 retrieves the ID information from the frame transmitted by the transceiver 2d, and registers in the RAM the retrieved ID information as reference ID information associated with the RL wheel 6d.

As above, the registration of ID information has been made for all the transceivers 2a-2d. Then, the operation of the tire inflation pressure detecting apparatus S1 is shifted from the ID registration mode to the periodic tire pressure transmission mode.

In the periodic tire pressure transmission mode, the controlling unit 22 of each of the transceivers 2a-2d receives the signals outputted from the sensing unit 21 and processes those signals. Then, the controlling unit 22 assembles into the frame both the tire pressure information indicative of the inflation pressure of the associated tire sensed by the sensing unit 21 and the ID information indicative of the identity of the each of the transceivers 2a-2d. Thereafter, the controlling unit 22 controls the transmitting unit 23 to periodically transmit the frame at predetermined time intervals (e.g., one minute).

On the other hand, the controlling unit 33 of the receiver 3 receives all the frames transmitted by the transceivers 2a-2d via the receiving antenna 31 and the receiving unit 32.

Then, the controlling unit 33 identifies, for each of the received frames, the wheel on which the one of the transceivers 2a-2d which has transmitted the frame is mounted by matching the ID information contained in the frame with the corresponding reference ID information registered in the memory.

Further, the controlling unit 33 determines, for each of the received frames, the inflation pressure of the associated tire based on the tire pressure information contained in the frame.

In addition, each of the frames transmitted by the transceivers 2a-2d may contain tire temperature information indicative of the temperature of air inside the associated tire. In this case, the controlling unit 33 of the receiver 3 can perform, when necessary, temperature compensation for the determined inflation pressures of the tires based on the temperature information contained in the respective frames.

Consequently, both the inflation pressure and location of each of the four tires are determined by the controlling unit 33. When the determined inflation pressure of any of the four tires is decreased to below the predetermined threshold Th, the controlling unit 33 informs, via the warning device 4, the driver of both the inflation pressure and location of the flattened tire.

When the ignition switch of the vehicle 1 is turned from on to off, the controlling unit 33 of the receivers 3 transmits again the first and second command signals respectively to the first and second triggering devices 5a and 5b.

Upon receipt of the first command signal, the first triggering device 5a transmits a trigger signal, which contains a stop command in the second command field but no signal-receiving level determination command in the first command field, thereby triggering the controlling units 22 of the transceivers 2a and 2b to enter the sleep mode. Similarly, upon receipt of the second command signal, the second triggering device 5b transmits a trigger signal, which contains a stop command in the second command field but no signal-receiving level determination command in the first command field, thereby triggering the controlling units 22 of the transceivers 2c and 2d to enter the sleep mode.

As a result, the entire operation of the tire inflation pressure detecting apparatus S1 is completed.

The above-described tire inflation pressure detecting apparatus S1 has the following advantages.

In the tire inflation pressure detecting apparatus S1, each of the transceivers 2a-2d is configured to: 1) receive a trigger signal transmitted by a corresponding one of the triggering devices 5a and 5b; 2) determine the strength V0 of the trigger signal thereat; 2) determine whether the determined strength V0 is within the signal strength range of V1 to V2 indicated by the trigger signal; and 4) perform a specific task in accordance with the specific command contained in the second command field of the trigger signal only when the strength V0 of the trigger signal is within the signal strength range of V1 to V2.

With the above configuration, the controlling unit 33 of the receiver 3 can select any (e.g., the transceiver 2a) of the transceivers 2a-2d as a target transceiver and control a corresponding one (e.g., the triggering device 5a) of the triggering devices 5a-5b to transmit a corresponding trigger signal (e.g., the first trigger signal). In the corresponding trigger signal, the signal strength range of V1 to V2 is so set, by the controlling unit 33, that the strength of the corresponding trigger signal falls within the signal strength range of V1 to V2 only at the target transceiver. Consequently, only the target transceiver can be triggered by the corresponding trigger signal to perform the specific task in accordance with the specific command contained in the second command field of the corresponding trigger signal.

Further, the specific command contained in the second command field of the corresponding trigger signal (e.g., the first trigger signal) may be the ID information transmission command. In this case, the target transceiver (e.g., the transceiver 2a) transmits, in response to receipt of the corresponding trigger signal, the frame that contains the ID information indicative of the identity of the target transceiver. Then, the controlling unit 33 of the receiver 3 identifies the frame, which is received by the receiver 3 immediately after transmission of the corresponding trigger signal, as being transmitted by the target transceiver and registers the ID information contained in the frame as reference ID information associated with the wheel (e.g., the FR wheel 6a) on which the target transceiver is located.

With the above configuration, it is possible for the tire inflation pressure detecting apparatus S1 to automatically perform the ID information registration for each of the transceiver 2a-2d.

While the above particular embodiment of the invention has been shown and described, it will be understood by those skilled in the art that various modifications, changes, and improvements may be made without departing from the spirit of the invention.

Modification 1

In the previous embodiment, each of the trigger signals is formatted into a single frame which contains the activation command in the head field and other commands in the first and second command fields.

However, each of the trigger signals may also be formatted into two separate frames, one of which contains the activation command and the other contains other commands.

Modification 2

In the previous embodiment, the triggering devices 5a and 5b are configured to transmit each of the first to fourth trigger signals only once. On the other hand, each of the transceivers 2a-2d is configured to: 1) determine, upon receipt a trigger signal, the strength of the trigger signal thereat and make a determination as to whether the determined strength of the trigger signal is within the signal strength range indicated by the trigger signal; and 2) perform the specific task in accordance with the specific command contained in the second command field of the trigger signal only when the determination yields an affirmative (i.e., YES) answer.

However, the triggering devices 5a and 5b may also be configured to transmit each of the first to fourth trigger signals a plurality of times. On the other hand, each of the transceivers 2a-2d may also be configured to: 1) determine, each time a trigger signal is received, the strength of the trigger signal thereat and make a determination as to whether the determined strength of the trigger signal is within the signal strength range indicated by the trigger signal; and 2) perform the specific task only when all the plurality of determinations yield an affirmative (i.e., YES) answer.

With the above configuration, it is possible to more accurately and reliably select a target transceiver from the transceivers 2a-2d when the differences between the strengths of the trigger signals at the transceivers 2a-2d are small.

Modification 3

In the previous embodiment, the tire inflation pressure detecting apparatus S1 is configured to have two triggering devices 5a and 5b.

However, the tire inflation pressure detecting apparatus S1 may also be configured to have only a single triggering device that is located on the body 7 of the vehicle 1 at different distances from all the transceivers 2a-2d.

Modification 4

In the previous embodiment, the tire inflation pressure detecting apparatus S1 is configured to have only a single receiving antenna 31.

However, the tire inflation pressure detecting apparatus S1 may also be configured to have four receiving antennas 31, each being located in close vicinity to a corresponding one of the four transceivers 2a-2d.

Modification 5

In the previous embodiment, the tire inflation pressure detecting apparatus S1 is configured to make the ID registration for the transceivers 2a-2d immediately after the ignition switch of the vehicle 1 is turned from off to on.

However, the tire inflation pressure detecting apparatus S1 may also be configured to make the ID registration for the transceivers 2a-2d immediately after a tire rotation or replacement is made for the vehicle 1.

Modification 6

In the previous embodiment, both the triggering devices 5a and 5b are located on the left side of the longitudinal centerline C-C of the vehicle 1.

However, it is also possible to locate either or both of the triggering devices 5a and 5b on the right side of the longitudinal centerline C-C.

Modification 7

In the previous embodiment, the vehicle 1 has four wheels 6a-6d, each having a corresponding one of the transceivers 2a-2d mounted thereon.

However, the vehicle 1 may also have a different number of wheels, for example six, each having a corresponding transceiver of the tire inflation pressure detecting apparatus S1 mounted thereon.

Modification 8

The previous embodiment is directed to the tire inflation pressure detecting apparatus S1.

However, the present invention can also be applied to transceivers and wireless communication systems for other uses.

What is claimed is:

1. A transceiver comprising:
a receiver that receives a trigger signal transmitted by a triggering device, the trigger signal including data identifying both a signal strength range and a command;
a signal strength determiner that determines strength of the trigger signal received by the receiver; and
a controller configured to:
determine whether the strength of the trigger signal determined by the signal strength determiner is within the signal strength range by data included in the trigger signal, and
perform a task in accordance with the command indicated by the trigger signal only when the strength of the trigger signal is within the signal strength range.

2. The transceiver as set forth in claim 1, further comprising a transmitter, wherein as the task, the controller controls the transmitter to transmit a response signal that contains ID information indicative of identity of the transceiver.

3. The transceiver as set forth in claim 1, wherein the triggering device transmits the trigger signal a plurality of times,
each time the receiver receives the trigger signal, the signal strength determiner determines the strength of the trigger signal received by the receiver and the controller makes the determination as to whether the strength of the trigger signal determined by the signal strength determiner is within the signal strength range included in the trigger signal, and
the controller performs the task only when all the results of the determinations are affirmative.

4. A wireless communication system for a vehicle, the system comprising:
first and second transceivers that are respectively located on first and second wheels of the vehicle, each of the transceivers being configured to:
receive a trigger signal that indicates both a signal strength range and a command,
determine strength of the trigger signal thereat,
determine whether the determined strength of the trigger signal is within the signal strength range indicated by the trigger signal, and
perform a task in accordance with the command indicated by the trigger signal only when the determined strength of the trigger signal is within the signal strength range;
a triggering device that transmits the trigger signal, the triggering device being located on a body of the vehicle at different distances from the first and second transceivers, so that the strengths of the trigger signal at the transceivers are different from each other;
a controller that is located on the body of the vehicle and configured to:
select one of the first and second transceivers,
set the signal strength range indicated by the trigger signal so that only the strength of the trigger signal at the selected one of the first and second transceivers is to fall within the signal strength range, and
control the triggering device to transmit the trigger signal, thereby triggering only the selected one of the first and second transceivers to perform the task in accordance with the command indicated by the trigger signal.

5. The wireless communication system as set forth in claim 4, further comprising a receiver and a memory both of which are located on the body of the vehicle,
wherein each of the first and second transceivers is configured to transmit, as the task, a response signal that contains ID information indicative of identity of the transceiver,
the receiver receives the response signal transmitted by the selected one of the first and second transceivers, and
the controller stores, in the memory, the ID information contained in the response signal received by the receiver as reference ID information associated with the wheel on which the selected one of the first and second transceivers is located.

6. The wireless communication system as set forth in claim 4, wherein the controller controls the triggering device to transmit the trigger signal a plurality of times,
each time the trigger signal is received, each of the first and second transceivers determines the strength of the trigger signal thereat, makes the determination as to whether the determined strength of the trigger signal is within the signal strength range indicated by the trigger signal, and
each of the first and second transceivers performs the task only when all the results of the determinations are affirmative.

7. The wireless communication system as set forth in claim 4, wherein the wireless communication system is incorporated in a tire inflation pressure detecting apparatus which includes:
first and second pressure sensors that are respectively located on the first and second wheels of the vehicle, each of the first and second pressure sensors being configured to sense inflation pressure of an associated one of tires fitted on the first and second wheels and output tire pressure information indicative of the sensed inflation pressure of the associated tire; and
a receiver located on the body of the vehicle,
wherein each of the first and second transceivers is configured to transmit, as the task, a response signal that contains the tire pressure information output from an associated one of the first and second pressure sensors,
the receiver receives the response signal transmitted by the selected one of the first and second transceivers, and
the controller determines, based on the tire pressure information contained in the response signal received by the receiver, the inflation pressure of the tire which is located on the same wheel as the selected one of the first and second transceivers.

8. A transceiver as in claim 1, wherein:
said trigger signal includes data identifying one of plural possible commands, and said controller is configured to perform one of plural possible tasks corresponding to the one of plural possible commands identified by data included in the trigger signal.

9. A wireless communication system for a vehicle, said system comprising:

a plurality of transceivers, each being located on a respectively corresponding wheel of a vehicle and being configured to perform tasks including receiving wireless signals, determining signal strength as being within or outside a range set by data included in a received trigger signal in accordance with commands contained by further data within the trigger signal; and a vehicle-mounted triggering device and controller that selects individual of said transceivers by setting the signal strength range specified by a transmitted triggering signal so that only the received strength of the trigger signal for that selected transceiver falls within the set signal strength range, thus controlling the triggering device to trigger only the selected one of the transceivers to perform a task also specified in the trigger signal.

* * * * *